US007324043B2

(12) United States Patent
Purden et al.

(10) Patent No.: US 7,324,043 B2
(45) Date of Patent: Jan. 29, 2008

(54) PHASE SHIFTERS DEPOSITED EN MASSE FOR AN ELECTRONICALLY SCANNED ANTENNA

(75) Inventors: George J. Purden, Westlake Village, CA (US); Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 243 days.

(21) Appl. No.: 11/219,400

(22) Filed: Sep. 2, 2005

(65) Prior Publication Data

US 2007/0052592 A1 Mar. 8, 2007

(51) Int. Cl.
*G01S 7/28* (2006.01)

(52) U.S. Cl. ...................... 342/175; 342/157; 342/158; 342/371; 342/372; 343/700 MS; 343/853; 257/275; 327/237

(58) Field of Classification Search ................ 342/175, 342/74, 81, 157, 158, 368–374; 257/275, 257/618, 656; 327/237, 493, 503, 504, 583; 331/107 DP, 176; 333/156, 229, 233; 343/700 MS, 343/701, 754, 853
See application file for complete search history.

(56) References Cited

U.S. PATENT DOCUMENTS 3,454,945 A * 7/1969 Hyltin ........................ 327/119
3,750,055 A * 7/1973 Funck ........................ 333/161
4,382,261 A * 5/1983 Freibergs et al. ........... 342/368
4,675,628 A * 6/1987 Rosen ........................ 333/164
5,329,255 A * 7/1994 Hayes et al. .................. 331/96
5,617,103 A 4/1997 Koscica et al. ...... 343/700 MS
5,680,073 A * 10/1997 Nathan et al. .............. 327/586
5,721,194 A 2/1998 Yandrofski et al. ......... 505/210
6,999,040 B2 * 2/2006 Robertson et al. .......... 343/772
7,173,503 B1 * 2/2007 Cadotte, Jr. ................. 333/164
2002/0175878 A1 11/2002 Toncich ...................... 343/860
2004/0063566 A1 * 4/2004 Caspers et al. ............. 501/134
2004/0089985 A1 * 5/2004 Sengupta et al. ........... 264/614
2006/0060900 A1 * 3/2006 Zhang et al. ............... 257/295
2007/0052592 A1 * 3/2007 Purden et al. ....... 343/700 MS

FOREIGN PATENT DOCUMENTS

FR 2538188 A1 * 6/1984
GB 2406443 3/2005

OTHER PUBLICATIONS

EP Search Report dated Jan. 31, 2007.

(Continued)

*Primary Examiner*—John B Sotomayor
(74) *Attorney, Agent, or Firm*—Jimmy L. Funke

(57) ABSTRACT

A system and method for an electronically scanned antenna is provided in which phase shifters are deposited en masse along with other electronically scanned antenna components on a wafer scale substrate using a thin film process. Alternative wafer scale sizes may be utilized to furnish a required antenna aperture area. Significant processing costs for radar and communication systems are saved utilizing the present invention as compared with contemporary discrete phase shifters that are individually mounted on an antenna. In an aspect, the phase shifter is made up of a base electrode, a barium strontanate titanate (BST) ferroelectric varactor and a top electrode. The BST ferroelectric material is a voltage variable dielectric, which generates a radiation phase. The radiation phase is regulated by a phase shifter control. The radiation phase generates an electromagnetic field about a radiating element and electromagnetic radio waves are radiated from the radiating element.

20 Claims, 5 Drawing Sheets

OTHER PUBLICATIONS

Database Inspec [Online] The Institute of Electrical Engineers, Stevenage, GB; 2001, York R et al: "Microwave integrated circuits using thin-film BST" XP002411793 Database Accession No. 7137789 *abstract* & ISAF 2000. Proceedings of the 2000 12th IEEE. International Symposium on Application of Ferroelectrics Jul. 21-Aug. 2, 2000 Honolulu, HI, USA, vol. 1, Jul. 21, 2000,-Aug. 2, 2000 pp. 195-200 vol. ISAF 2000. Proceedings of the 2000 12th IEEE International Symposium on Applications of Ferroelectrics (IEEE Cat. No. 00CH37076) IEEE Piscataway, NJ, USA ISBN: 0-7803-5940-2.

* cited by examiner

PHASE SHIFTERS DEPOSITED EN MASSE FOR AN ELECTRONICALLY SCANNED ANTENNA

FIELD OF THE INVENTION

The invention relates generally to an electronically scanned antenna, and more particularly to phase shifters deposited en masse along with other antenna components on a wafer scale substrate using a thin film process.

BACKGROUND OF THE INVENTION

Current radar systems, including automotive radar systems, often require wide angle coverage having narrow beams and a high update rate, all in a small package size. As an example, current automotive radar systems for applications including collision warning, pre-crash sensing and adaptive cruise control incorporate a fixed beam, switched beam or mechanically scanned antenna that have limited performance by falling short of these requirements. In the case of mechanically scanned antennas, the update rate is too slow for current demands, system size and cost are high, and reliability is low.

Allowing an antenna to electronically scan has benefits over a mechanically scanned antenna, including fast scanning, the ability to host multiple antenna beams on the same array, eliminating mechanical complexity and reliability issues, the ability to angle the antenna in such a way that it reduces radar cross section and the ability to operate over a wider frequency range, a wide field of view, a range of beamwidths and a high update rate.

Electronically scanned antennas have broad applicability for both commercial and military applications, including advanced radar systems, cellular base stations, satellite communications, and automotive anti-collision radar. However, conventional electronically scanned antennas using discrete phase shifters are expensive and introduce excessive RF loss at typical automotive radar frequencies (i.e., 24 GHz and 76 GHz). Contemporary systems individually assemble, package, individually mount and individually test discrete phase shifters on an antenna structure. Typically, ten to hundreds of phase shifters are mounted on a scanning antenna. In military applications, several hundred phase shifters are commonly mounted on a scanning antenna.

Electronically scanned antennas have been utilized since electronically controlled phase shifters were employed. Phase shifters allow an antenna beam to be steered in a desired direction without physically repositioning the antenna. Phase shifters are critical elements for electronically scanned phase array antennas, and typically represent a significant amount of the cost of producing an antenna array. Phase shifters can represent nearly half of the cost of the entire electronically scanned array. This considerable cost has limited the deployment of electronically scanned antennas and has largely curbed their use to military systems and a limited number of commercial applications such as cellular telephone base stations. The application of these technologies to consumer systems is prohibitive due to fabrication costs. Phase shifters are manufactured by standard manufacturing processes and include switch based and continuously variable phase shifters such as Gallium-Arsenide (GaAs) based varactors, GaAs FETs, switched delay lines or high/low pass filter structures using PIN diodes or FET switches, ferromagnetic systems, and Micro-electrical mechanical system (MEM) varactors and switches. There is a significant demand, especially in the wireless and microwave industries, for affordable phase shifters that can reduce the cost of an electronically scanned antenna system and allow them to be deployed more widely.

SUMMARY OF THE INVENTION

A system and method for an electronically scanned antenna is provided in which phase shifters are directly deposited en masse for a wafer scale antenna. A virtually unlimited number of phase shifters can be created for an antenna, and significant processing costs are saved as compared with contemporary discrete phase shifters that are individually mounted on an antenna. Both one-dimensional and two-dimensional electronically scanned antennas can be fabricated at essentially the same cost by utilizing the present invention. Patterning of backside metal, vias and other expensive processes and steps are avoided.

Applications for the present invention include radar, communication systems, and more specifically, automotive safety sensors (including typical automotive radar frequencies of 24 GHz and 76 GHz) and military missile seeker systems using small aperture microwave and millimeter wave electronically scanned antennas. The phase shifters of the present invention may be employed with applications requiring a wafer scale size array.

Features of the invention are achieved in part by fabricating variable capacitors en masse along with other electronically scanned antenna components, including phase shifter control lines and connections, and radiating elements. In an embodiment, the variable capacitor is made up of a base electrode, a barium strontanate titanate (BST) ferroelectric varactor and a top electrode. The BST ferroelectric varactor is deposited on a low cost insulating wafer scale substrate using a thin film process. In this way, phase shifters may be deposited en masse along with other antenna components, rather than being individually mounted on an antenna. Thin film processes that can be employed include sputtering, and chemical vapor deposition (CVD) such as metal-organic chemical vapor deposition (MOCVD). Alternative wafer scale sizes are utilized to furnish a required antenna aperture area. A wafer scale antenna is provided to reduce the cost of small aperture arrays.

The BST ferroelectric material is a voltage variable dielectric, which generates a radiation phase. Ferroelectric materials exhibit a high capacitance density and so large value capacitor can be constructed in a small physical area. The radiation phase is regulated by a phase shifter control. The phase shifter control applies an analog DC voltage to the BST ferroelectric material to adjust the value of the phase shift. The antenna radiating elements are fed by a microstrip power divider via the BST ferroelectric material. The radiation phase generates an electromagnetic field about the radiating element and electromagnetic radio waves are radiated from the radiating element.

The radiating elements and external connections make up a single metallization layer. Further, antenna elements, including radiators, ground plane and resistive terminations are fabricated using standard foundry metallizations and depositions. Additionally, individual control lines can be utilized to connect a phase shifter control to a variable capacitor. Alternatively, the antenna array itself (the radiating elements) may be utilized as a distribution network.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, the numerical values set forth in the following specification and claims are approximations that may vary depending upon the desired antenna characteristics sought to be obtained by the present invention.

A system and method are described herein for providing an electronically scanned antenna (ESA). The present invention provides a low manufacturing cost and reliably reproducible ESA as compared with contemporary systems. Processing steps are minimized utilizing the present invention. In the present invention, phase shifters are fabricated en masse in a series of depositions along with other ESA components including phase shifter control lines and connections and radiating elements. En masse as used herein is defined as "as a whole." Since the phase shifters are fabricated en masse along with other electronically scanned antenna components, a virtually unlimited number of phase shifters can be created for an antenna. Further, patterning of backside metal, vias and other expensive processes and steps are avoided utilizing the present invention. In an embodiment, the phase shifters include a ferroelectric material that is deposited on a low cost wafer scale substrate using a thin film process.

Embodiments of the present invention may be utilized with radar and communication systems. Communications systems that can utilize the present invention include point-to-point microwave links, links between buildings, and data links. Automotive safety sensors (including typical automotive radar frequencies of 24 GHz and 76 GHz) and military missile seeker systems using small aperture microwave and millimeter wave electronically scanned antennas can benefit from the present invention.

Figure 1A:
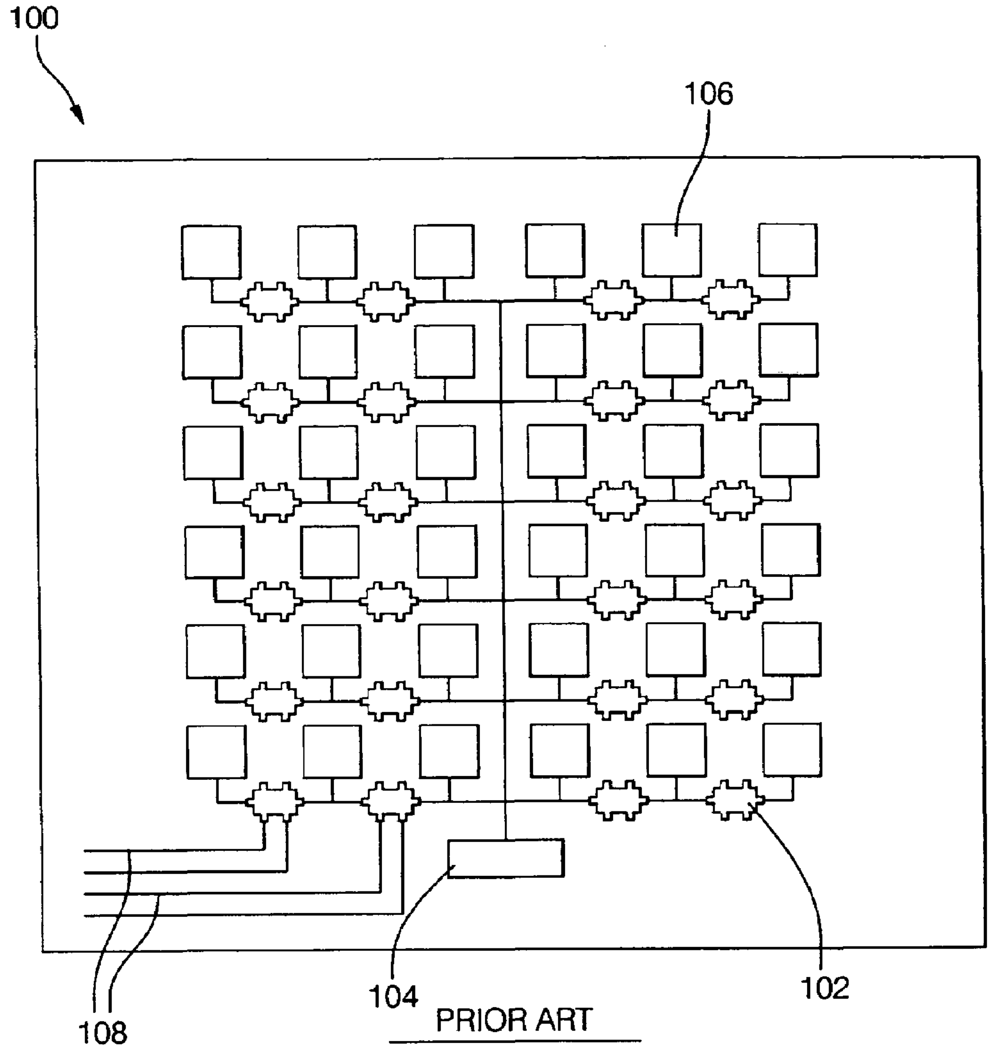
PRIOR ART FIG. 1 A
FIG. 1A is a schematic view of a conventional two-dimensional scanning array utilizing discrete integrated circuit phase shifters.

Referring to the drawings wherein identical reference numerals denote the same elements throughout the various views, FIG. 1A illustrates a schematic view of a conventional two-dimensional scanning array 100 utilizing discrete integrated circuit phase shifters 102. A microwave feed 104 provides an input signal to the phase shifters 102, and phase shifter control lines 108 provide DC signals to regulate the radiation phase of phase shifters 102. The phase shifter control lines 108 are directly connected to phase shifters 102. Discrete integrated circuit phase shifters 102 generate a radiation phase. Patch radiator 106 radiates electromagnetic radio waves from an electromagnetic field about patch radiator 106, generated by the radiation phase. In contemporary systems as in the type shown in FIG. 1A, fabrication expense is increased due to the cost of the phase shifter components and the individual mounting of discrete phase shifters on a substrate or supporting structure.

Figure 1B:
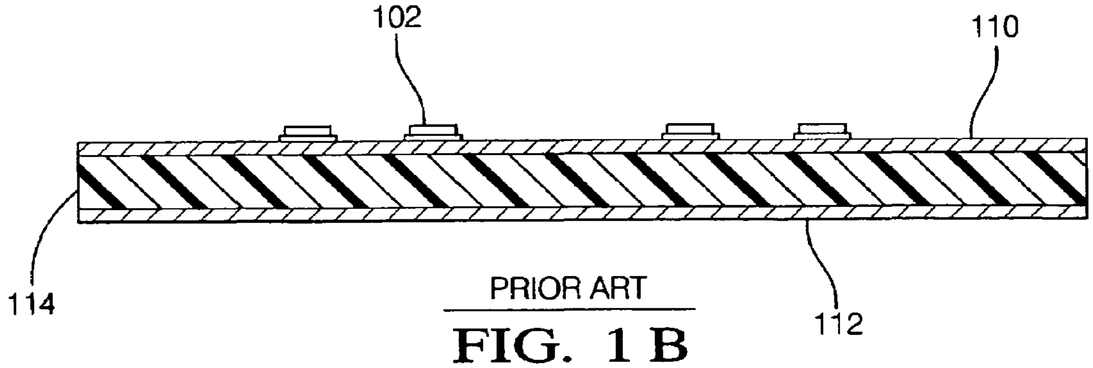
PRIOR ART FIG. 1 B
FIG. 1B is a diagrammatic sectional view of the supporting structure of the conventional two-dimensional scanning array as in FIG. 1A.

FIG. 1B shows a diagrammatic sectional view of the supporting structure of the conventional two-dimensional scanning array as in FIG. 1A. The phase shifter integrated circuits 102 are mounted to top metal for interconnects and patches 110 and a circuit board 114. The ground plane metal 112 provides a ground for the circuit. The phase shifter integrated circuits 102 are individually assembled, packaged, individually positioned and mounted (soldered down) and individually tested on the antenna structure.

Figure 2:
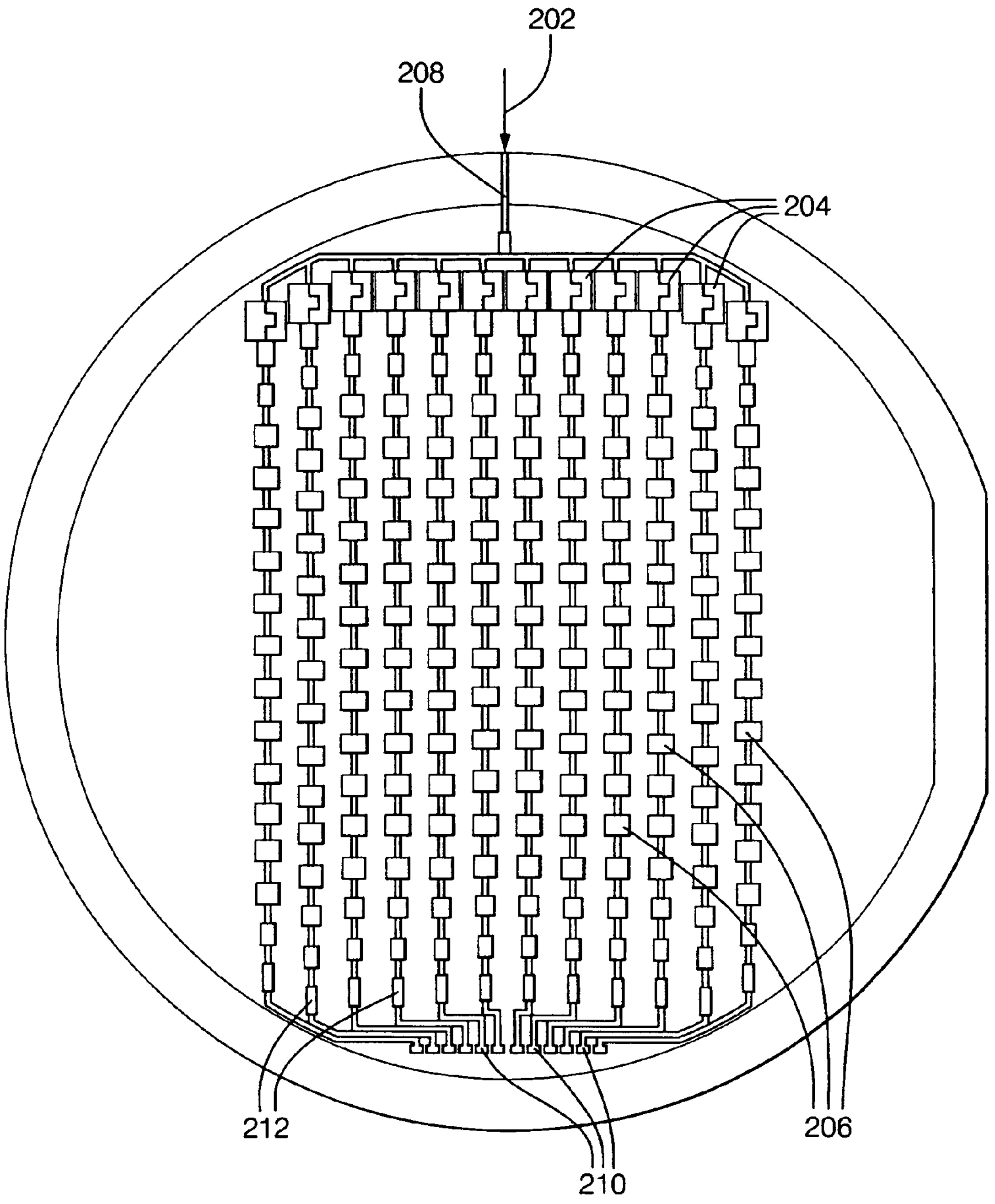
FIG. 2 is a perspective view of a wafer scale integration of antenna components, in an embodiment of the present invention.

FIG. 2 is a perspective view of a wafer scale integration of antenna components, in an embodiment of the present invention. RF input 202 feeds an RF signal to microstrip feed 208. RF input 202 can use a standard coaxial connection that interfaces with a quasi TEM of microstrip feed 208 with little loss. Microstrip feed 208 passes on the RF signal to phase shifter 204. The phase shifter 204, a ferroelectric material, is a voltage variable dielectric, which generates a radiation phase. The radiation phase from phase shifter 204 generates an electromagnetic field about the radiating elements 206 and electromagnetic radio waves are radiated from the radiating elements 206.

The capacitance of each phase shifter 204 is a function of voltage (described in FIG. 6 infra), and each phase shifter 204 receives a predetermined voltage for regulating the phase shift and causing the antenna to scan. The radiation phase from each phase shifter 204 element is regulated by a phase shifter control, which provides an analog DC control voltage or current. Analog control voltages are used when the phase shifter 204 must continuously change with voltage. With digital control voltages, the phase shifter 204 may jump by discrete bits. The pads for the DC phase shift 210 are connected to the radiating elements 206 and supply the analog DC voltage for regulating the radiation phase. In an embodiment, DC control voltage pads 210 are connected using wirebonds to a circuit board interfacing with a ribbon cable. Additionally, termination resistors 212, connected to the radiating elements 206, suppress spurious lobes due to reflections from the end of the radiating elements 206.

Figure 3:
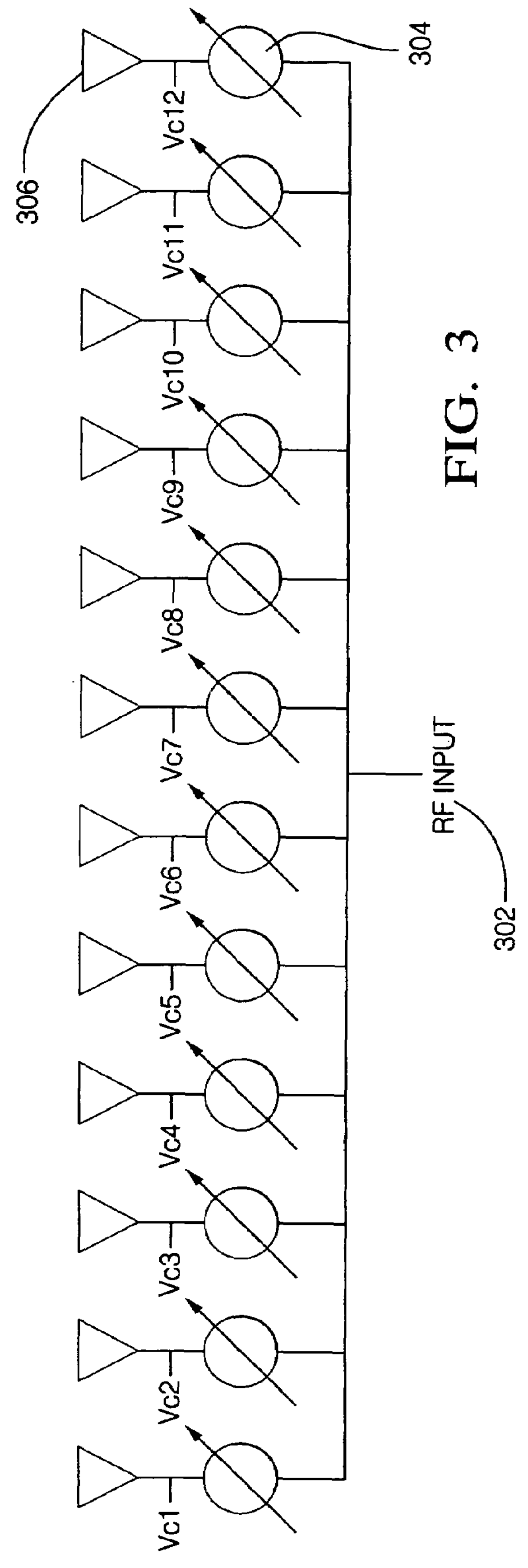
FIG. 3 is a schematic view of antenna elements having phase shifters as in FIG. 2—that control the phase of radiation from the antenna elements, in which the present invention can be useful.

Referring to FIG. 3, a schematic view is shown of antenna elements 306 having phase shifters 304 that control the phase of radiation from the antenna elements 306, as in FIG. 2. Both one-dimensional and two-dimensional electronically scanned antennas can be fabricated at substantially the same cost. As an example, when scanning the antenna in one-dimension, each line of radiating antenna elements 306 requires one phase shifter 304. In the case of one-dimensional scanning, 12 phase shifters are employed. Whereas, when scanning the antenna in two-dimensions, each radiating antenna element 306 requires one phase shifter. In the case of two-dimensional scanning, an array of 144 phase shifters is formed.

By fabricating phase shifters 304 en masse, each radiating antenna element 306 requiring one phase shifter 304 can be fabricated for substantially the same cost as each line of radiating antenna elements 306 requiring one phase shifter 304. Thus, the present invention fabricates 144 phase shifters for substantially the same cost as 12 phase shifters. In contrast, conventional systems individually assemble and mount phase shifters, and for each phase shifter mounted the cost increases. Hence, using conventional systems, two-dimensional scanning requiring 144 phase shifters is prohibitively costly for most applications.

Figure 4:
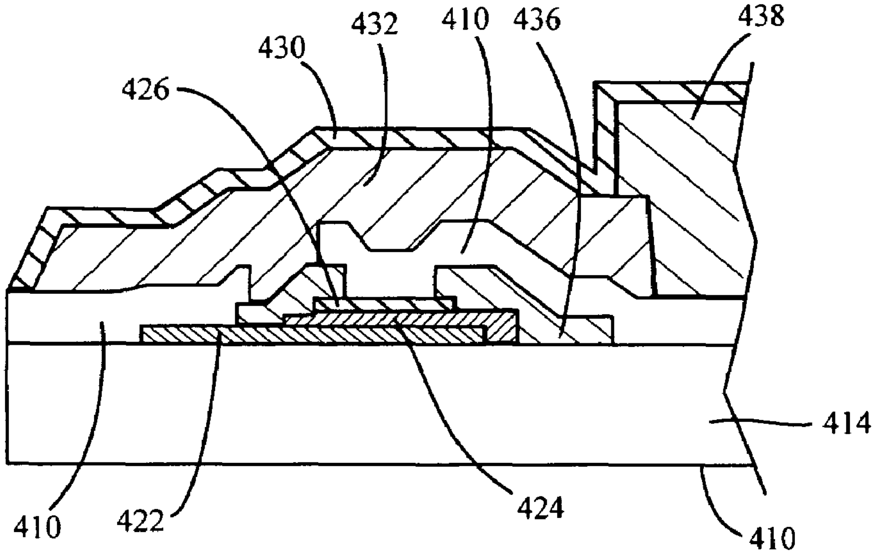
FIG. 4 is a diagrammatic sectional view of the wafer scale integration of antenna components as in FIG. 2, in an embodiment of the present invention.

FIG. 4 is a diagrammatic sectional view of the wafer scale integration of antenna components as in FIG. 2. A wafer scale antenna is provided in part to reduce the cost of small aperture arrays. Alternative wafer scale sizes can be utilized by the present invention to furnish a required antenna aperture area. In one application, a four-inch diameter wafer is utilized. A larger wafer size and larger antenna is employed for applications requiring a more directed beam and smaller beamwidth. Also, for signals having a lower frequency and an equivalent beamwidth, a larger aperture is required and thus a larger wafer is employed.

The first electrode 422 (i.e., platinum), ferroelectric layer 424, and second electrode 426 (i.e., platinum) make up a variable capacitor (a phase shifter). In an embodiment, the ferroelectric layer is a barium strontanate titanate (BST) ferroelectric varactor. The first interconnect 410 (for example, a gold Au interconnect metallization layer) acts as the radiating element. Alternatively, the first interconnect 410 contacts the second interconnect 438, and the second interconnect 438 acts as the radiating element. The microstrip feed, control lines and connections and radiating elements are implemented on first interconnect 410. The first interconnect 410 contacts first electrode 422. The passivation layer 430 and 436, a non-conductive and inert material acts as a shield. The passivation is in part used to shield the phase shifters, since gold interconnects do not require passivation being nonreactive. The substrate 414 is also inert and non-conductive.

Antenna components of the present invention are fabricated (grown) collectively including phase shifters, radiating elements, phase shifter control lines and connections and termination resistors. These components are fabricated en masse in a series of depositions including first interconnect 410, first electrode 422, ferroelectric layer 424, second electrode 426, and termination resistor layer (not shown). Passivation layers 430, 436 and insulation 432 may further be deposited en masse. In contrast, conventionally, ferroelectric phase shifters are fabricated, individually divided, packaged and individually mounted on a further substrate. These components of the present invention are deposited on substrate 414, which includes a ground plane metal layer 410. A sapphire substrate may be used. Alternatively, a glass or quartz substrate may be used for lesser cost.

Antenna elements, including radiators, ground plane, and resistive terminations are fabricated using standard foundry metallizations and depositions. The first electrode 422 is selectively deposited partly across the wafer substrate. The ferroelectric layer 424 is subsequently deposited. The second electrode 426 is next deposited. Masking steps are used during deposition steps to properly position materials. Following a passivation layer 436, first interconnect 410 is deposited effecting the microstrip feed, control connections and radiating patches. An insulation 432 and second passivation layer 430 may next be deposited along with the optional second interconnect 438. In an example, a 4-inch, 500 μm thick substrate is utilized. In an embodiment, the variable capacitor is deposited on a low cost insulating wafer scale substrate with high-quality passives using a thin film process. Thin film processes that can be employed include sputtering, and chemical vapor deposition (CVD) such as metal-organic chemical vapor deposition (MOCVD). In this way, the phase shifters may be deposited en masse along with other antenna components, rather than being individually mounted on an antenna. Thin film processes are employed for advantages as discussed in FIG. 6, infra. In an embodiment, the radiating elements and external connections make up a single metallization layer.

The phase shifters are symmetrical and balanced and provide a transition from an unbalanced to a balanced structure. That is, the microstrip feed includes a ground connection (sapphire substrate) and a connection out to the radiating elements and the phase shifter control. This is an asymmetrical and unbalanced structure. The phase shifters are fabricated with two parallel lines and a BST deposit. In an embodiment, the phase shifters provide a shunt from the input to the phase shifter control connections.

Figure 5:
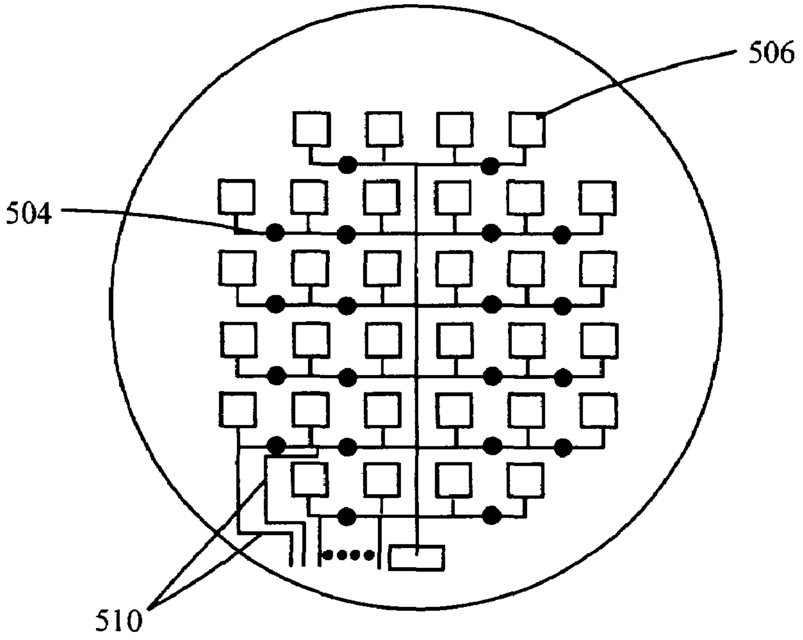
FIG. 5 illustrates a schematic view of the wafer scale integration of antenna components as in FIG. 2, in an embodiment of the present invention.

FIG. 5 illustrates a schematic view of the wafer scale integration of antenna components as in FIG. 2. As shown here, in an embodiment, individual phase shifter control lines 510 are utilized to connect a DC phase shifter control to a phase shifter 504. In an alternative embodiment (shown in FIG. 2), the antenna array itself (the radiating elements 506) are utilized as a DC phase shifter control distribution network, and thus separate phase shifter control lines are not required. As shown in FIG. 2, the phase shifter controls are physically connected to the variable capacitor via the radiating elements.

A further understanding of the above description can be obtained by reference to the following experimental result examples that are provided for illustrative purposes and are not intended to be limiting.

Figure 6:
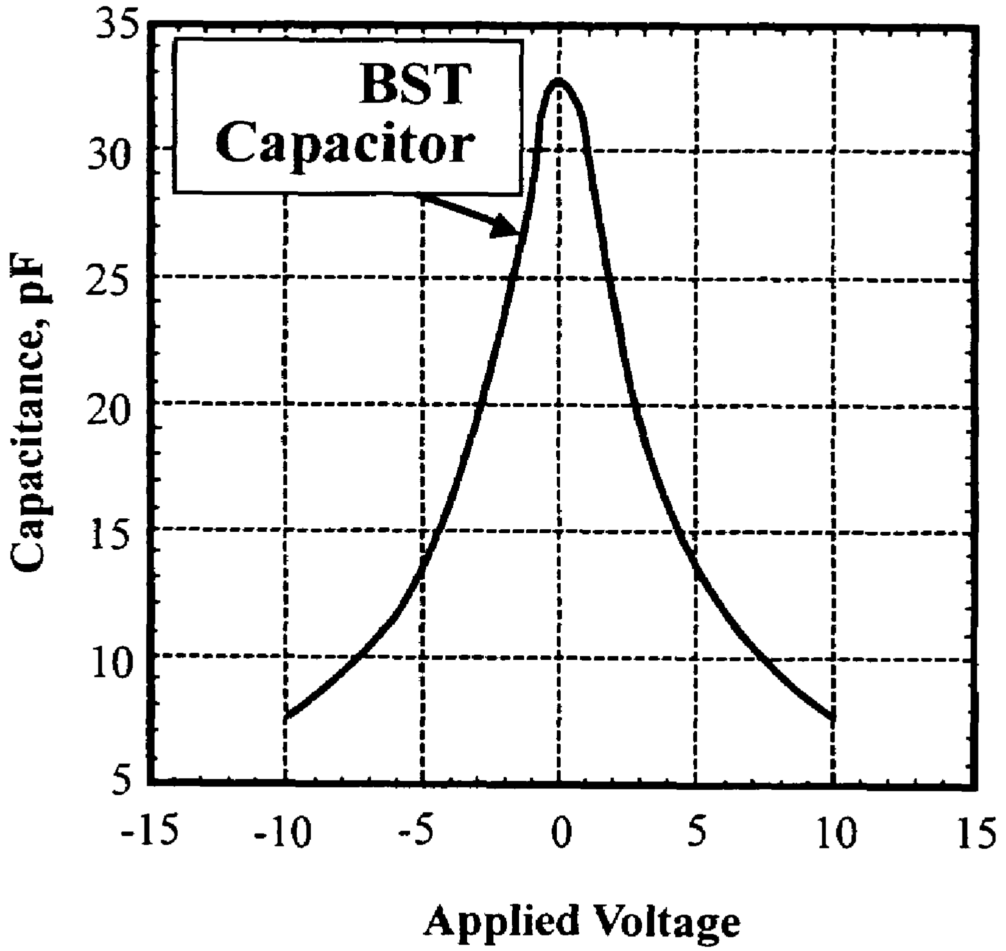
FIG. 6 is a graphical illustration of example applied control voltages to a barium strontanate titanate (BST) ferroelectric phase shifter and a measured capacitance response, in an embodiment of the present invention.

FIG. 6 shows a graphical illustration of example applied control voltages to a BST ferroelectric phase shifter and a measured capacitance response. As can be observed, thin-film ferroelectrics require only a moderate voltage change to adjust the capacitance. In an embodiment of the present invention, the useable tunability of the thin-film BST is 2:1 or more. That is, changing the capacitance of the ferroelectric material with an applied voltage gives the ferroelectric material the ability to tune the capacitance over a wide range of at least a 2:1 capacitance to voltage change. Ferroelectric materials exhibit a high capacitance density and so a large value capacitor can be constructed in a small physical area. Since small tunable capacitors can be formed, many can be constructed on a single wafer. In an embodiment, the present invention provides a voltage variable dielectric having a high capacitance density (10 to 20 $nF/mm^2$), and a wide range of control voltages is utilized, i.e., 5 to 30 volts. In an example, diode-conduction is not observed, the BST operating at zero bias with large AC swings.

Other features and advantages of this invention will be apparent to a person of skill in the art who studies this disclosure. For example, it is to be appreciated that thin-film ferroelectric materials exhibit a flat temperature response profile, giving thin-film ferroelectric materials controllability over wide temperature ranges. Thus, exemplary embodiments, modifications and variations may be made to the disclosed embodiments while remaining within the spirit and scope of the invention as defined by the appended claims.

We claim:

1. An electronically scanned antenna comprising:

a first electrode having a radio frequency input;

a variable capacitor for generating a radiation phase, the variable capacitor formed by the first electrode, a ferroelectric material and a second electrode, wherein the ferroelectric material is situated adjacent to, and separates, the first electrode and the second electrode;

a phase shifter control connection for regulating the radiation phase; and a radiating element for radiating electromagnetic radio waves from an electromagnetic field about the radiating element generated by the radiation phase, wherein a plurality of the variable capacitor, the phase shifter control connection, and the radiating element are fabricated en masse in a series of depositions.

2. The electronically scanned antenna as in claim 1, wherein the first electrode, the second electrode and the ferroelectric material are formed to a wafer scale substrate utilizing a thin film process including one of sputtering and chemical vapor deposition.

3. The electronically scanned antenna as in claim 1, wherein the ferroelectric material comprises barium strontanate titanate.

4. The electronically scanned antenna as in claim 2, wherein the substrate is at least one of sapphire, quartz and glass.

5. The electronically scanned antenna as in claim 1, wherein the phase shifter control connection is connected to the variable capacitor via the radiating element.

6. The electronically scanned antenna as in claim 1, wherein individually the radiating elements are joined to the variable capacitors for scanning in two dimensions.

7. The electronically scanned antenna as in claim 1, wherein a frequency of one of 24 GHz and 76 GHz is substantially radiated from the radiating element.

8. A phase shifter for an electronically scanned antenna comprising:

a variable capacitor for generating a radiation phase, the variable capacitor formed by a first electrode having a radio frequency input, a ferroelectric material and a second electrode, wherein the ferroelectric material is situated adjacent to, and separates, the first electrode and the second electrode, and wherein a plurality of the variable capacitor are fabricated en masse in a series of depositions with a phase shifter control connection for regulating the radiation phase and a radiating element for radiating electromagnetic radio waves from an electromagnetic field about the radiating element generated by the radiation phase.

9. The phase shifter as in claim 8, wherein the first electrode, the second electrode and the ferroelectric material are formed to a wafer scale substrate utilizing a thin film process including one of sputtering and chemical vapor deposition.

10. The phase shifter as in claim 8, wherein the ferroelectric material comprises barium strontanate titanate.

11. The phase shifter as in claim 9, wherein the substrate is at least one of sapphire, quartz and glass.

12. The phase shifter as in claim 8, wherein the phase shifter control connection is connected to the variable capacitor via the radiating element.

13. The phase shifter as in claim 8, wherein individually the radiating elements are joined to the variable capacitors for scanning in two dimensions.

14. The phase shifter as in claim 8, wherein a frequency of one of 24 GHz and 76 GHz is substantially radiated from the radiating element.

15. A method of forming an electronically scanned antenna comprising:

depositing a first electrode to a substrate;

depositing a ferroelectric material to the first electrode;

depositing a second electrode to the ferroelectric layer; and depositing a radiating element to the second electrode, wherein the radiating element includes a phase shifter control connection for regulating the radiation phase, wherein the first electrode includes a radio frequency input, wherein a variable capacitor, for generating a radiation phase, is formed by the first electrode, the ferroelectric material and the second electrode, and wherein a plurality of the variable capacitor are fabricated en masse with the phase shifter control connection and the radiating element.

16. The method as in claim 15, wherein the first electrode, the second electrode and the ferroelectric material are formed to a wafer scale substrate utilizing a thin film process including one of sputtering and chemical vapor deposition.

17. The method as in claim 15, wherein the ferroelectric material comprises barium strontanate titanate.

18. The method as in claim 16, wherein the substrate comprises at least one of sapphire, quartz and glass.

19. The method as in claim 15, wherein the phase shifter control is connected to the variable capacitor via the radiating element.

20. The method as in claim 15, wherein individually the radiating elements are joined to the variable capacitors for scanning in two dimensions.

* * * * *